(12) United States Patent  (10) Patent No.: US 6,470,063 B2
Liew  (45) Date of Patent: Oct. 22, 2002

(54) METHOD AND DEVICE TO UPDATE DATA TRANSFER COUNT FOR DISC DRIVE

(75) Inventor: Bee-Bee Liew, Santa Clara, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 22 days.

(21) Appl. No.: 09/804,119

(22) Filed: Mar. 12, 2001

(65) Prior Publication Data

US 2002/0126793 A1 Sep. 12, 2002

(51) Int. Cl.[7] ................................................. G07C 3/00
(52) U.S. Cl. .......................... 377/2; 377/16; 369/33.01; 369/32.01; 369/44.28; 369/47.32; 369/47.33; 369/53.31; 369/124.04
(58) Field of Search ........................... 369/33.01, 32.01, 369/44.28, 47.32, 47.33, 53.31, 124.04; 377/2, 15, 16

(56) References Cited

U.S. PATENT DOCUMENTS 6,323,991 B2 * 11/2001 Cisternino et al. .......... 359/329

* cited by examiner

Primary Examiner—Margaret R. Wambach
(74) Attorney, Agent, or Firm—Douglas S. Rupert; Wildman, Harrold, Allen & Dixon

(57) ABSTRACT

Method and device to update a data count in a data transfer operation in which a data counter generates an intermediate count value in accordance with a first amount of data to be transferred to a storage media; and an augmenter augments the intermediate count value by a specified count value in accordance with data to be transferred to the storage media in addition to the first amount of data, wherein the updated count value is loaded into the data counter such that the intermediate count value becomes equal to the updated count value during the data transfer operation.

24 Claims, 8 Drawing Sheets

Block Diagram of Disk Drive System

Block Diagram of Disk Drive System

Block Diagram of a Disk Drive System

METHOD AND DEVICE TO UPDATE DATA TRANSFER COUNT FOR DISC DRIVE

BRIEF DESCRIPTION OF THE INVENTION

This invention relates generally to a method and device to update the data transfer count for a disc drive while data is being transferred.

BACKGROUND OF THE INVENTION

Computers are frequently connected to an optical disc drive. Data is transferred to and from the optical drive which has a large storage capacity. Data transfers to and from optical disc drives tend to be a good deal slower than transfers from memory chips or magnetic storage mediums. One of the reasons data transfer is slow is the inability to add additional data to a data transfer once the transfer has been initiated. In a conventional write operation, data is written to the disc in blocks, and each block has a predetermined number of bytes. The number of blocks to be written is determined before the write operation is started. This number is set in a counter. As each successive block is written the intermediate count value held by the counter is decremented. When the intermediate count value reaches zero the write operation is complete. Under such an arrangement, the number of blocks to be written to the disc in a given write sequence is specified prior to beginning the data transfer and the number of blocks to be written on the disc cannot be changed during the write sequence. Instead, to transfer additional blocks, a separate write sequence must be initiated. Initiating a separate write sequence is cumbersome and increases the amount of time to transfer data to the disc.

In view of the foregoing, it would be highly desirable to provide a method and device that allows the number of blocks to be written to a disc to be changed during a data transfer operation. Such a method and device would reduce the amount of time to write data on an optical disc.

SUMMARY OF THE INVENTION

A device modifies an amount of data transferred during a data transfer operation with a disc drive. A data counter generates an intermediate count value in accordance with an amount of data to be transferred. An augmenter augments the intermediate count value by a specified count value to generate an updated count value. The updated-count value is loaded into the data counter such that the intermediate count value becomes equal to the updated count value during the data transfer operation.

In another aspect of the invention, a disc controller uses the device to write data on the disc. Yet another aspect of the invention provides a method of modifying the amount of data transferred during a data transfer operation with a disc drive.

By modifying the amount of data during a data transfer operation, the invention reduces the amount of time to record data on the optical disc.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION

Figure 1:
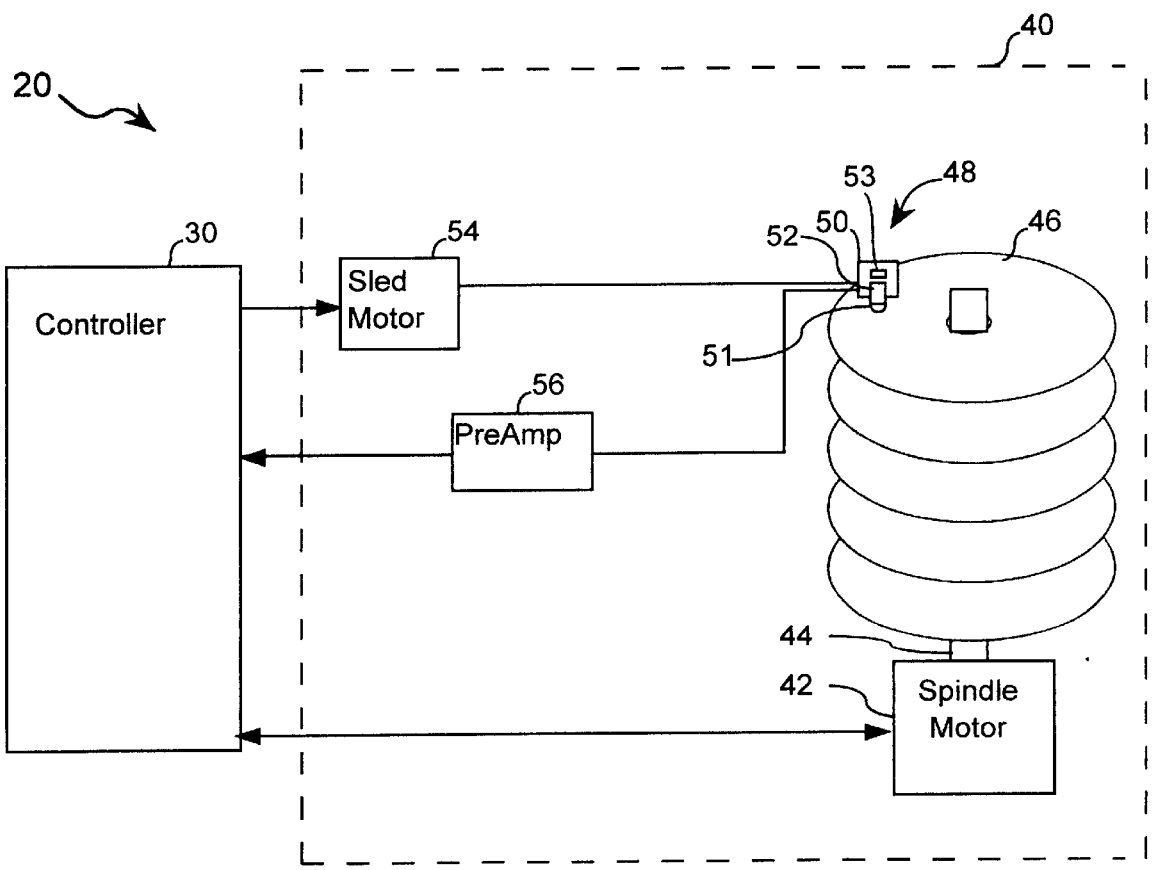
FIG. 1 illustrates a general architecture of a disc drive system in accordance with an embodiment of the present invention.

In FIG. 1, a disc drive system 20 has a controller unit 30 that connects to a disc drive 40, such as an optical disc drive. In disc drive 40, a spindle motor 42 is attached to a spindle 44 which supports at least one disc 46. In response to commands from controller unit 30, spindle motor 42 rotates spindle 44 and one or more discs 46.

While disc 46 is rotating, optical head assembly 48 reads information from or writes information to disc 46. Optical head assembly 48 includes sled carriage 50, lens 51, actuator 52 and photo-sensor 53. Sled carriage 50 supports photo-sensor 53 and actuator 52. Actuator 52 is a voice coil motor that supports and positions lens 51. Lens 51 transmits a light beam from a laser diode to disc surface 46 and transmits the reflected light beam from disc surface 46 to photo-sensor 53. Sled motor 54 moves optical head assembly 48 including actuator 52 to position optical head assembly 48 with respect to a target track on disc 46. Actuator 52 finely positions lens 51 over the target track's centerline. Preamplifier 56 receives an analog RF signal from the head 48 and outputs an analog read channel signal.

Figure 2:
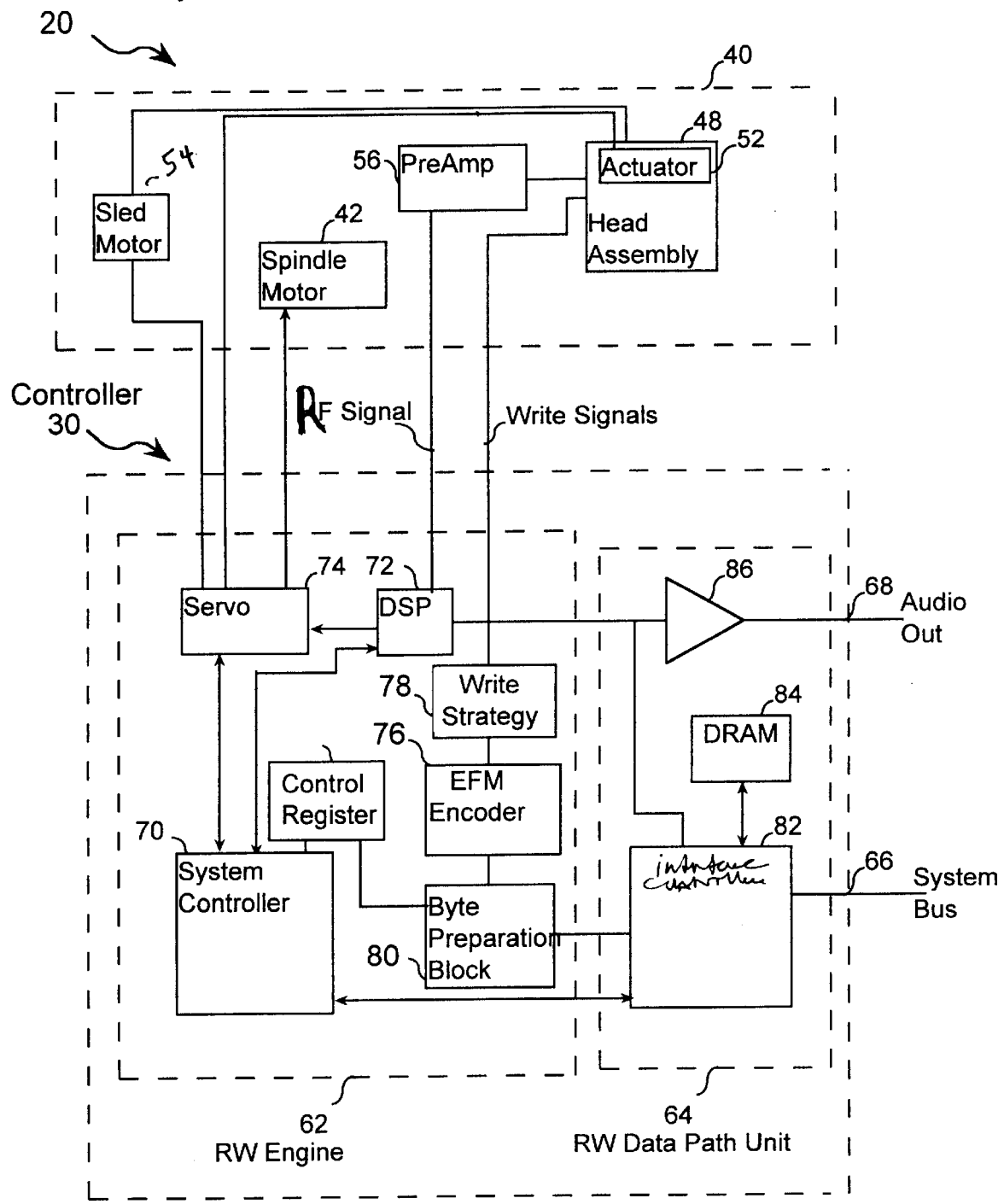
FIG. 2 illustrates a general architecture of a disc controller interfaced to a disc drive system in accordance with an embodiment of the present invention.

FIG. 2 is a more detailed block diagram of the disc controller 30 and its associated disc drive 40. Disc controller 30 includes read/write (RW) engine 62 that interfaces with read/write data path unit 64. RW engine 62 communicates directly with disc drive 40 while RW datapath unit 64 communicates with system bus 66 and supplies an audio signal to audio output line 68.

RW engine 62 includes system controller 70, digital signal processor 72 and servo control unit 74. System controller 70 receives commands from and sends status information to system bus 66 via RW datapath unit 64. In response to commands from system bus 66, system controller 70 sends commands to and receives status information from digital signal processor (DSP) 72 and servo control unit 74 to read data from or write data to the disc. Servo control unit 74 positions the head assembly 48 with respect to a target track, and then keeps head assembly 48 centered and focused on the target track. To do so, servo control unit 74 receives control signals from DSP 72. Servo control unit 74 sends signals to sled motor 54, actuator 52 and spindle motor 42 to control focusing and tracking. Servo control unit 74 communicates with spindle motor 42, actuator 52 and sled motor 54 to position head assembly 48 precisely to read the desired information from disc 46.

DSP 72 receives the analog read channel signal from preamplifier 56. The analog read channel signal includes both digital data and control information. DSP 72 processes the analog read channel signal and outputs control signals that are used by servo control unit 74.

To write data to a disc, EFM encoder 76 receives data bytes from read/write data path unit 64, encodes the data bytes and outputs control signals. Encoder 76 encodes the data for a specified velocity.

Write strategy module 78 receives the EFM signal and the write parameters, and outputs laser power control signals. Depending on the specified velocity and the serial bit pattern being written to the disc, write strategy module 78 generates the laser power control signals. In particular, write strategy module 78 includes device 80 of the present invention that adjusts the write parameters while writing data prior to reaching the specified constant linear velocity.

In read/write data path unit 64, when writing data to a disc, interface controller 82 receives data from system bus 66, processes the data, and stores the data in DRAM 84. Interface controller 82 sends the data bytes from DRAM 84 to encoder 76.

When reading data from a disc, interface controller 82 receives digital data signal from DSP 72 in a serial stream, descrambles the data, and assembles the data into eight-bit bytes. Interface controller 82 then stores the data in DRAM 84. DRAM 84 acts as a buffer for digital data from DSP 72. Interface controller 82 also performs error detection and correction operations on the buffered data and transfers the data to system bus 66.

To provide an audio output, a digital-to-analog converter (DAC) 86 receives the digital data signal from the DSP 72 and outputs an audio signal on the audio output line 68.

Figure 3:
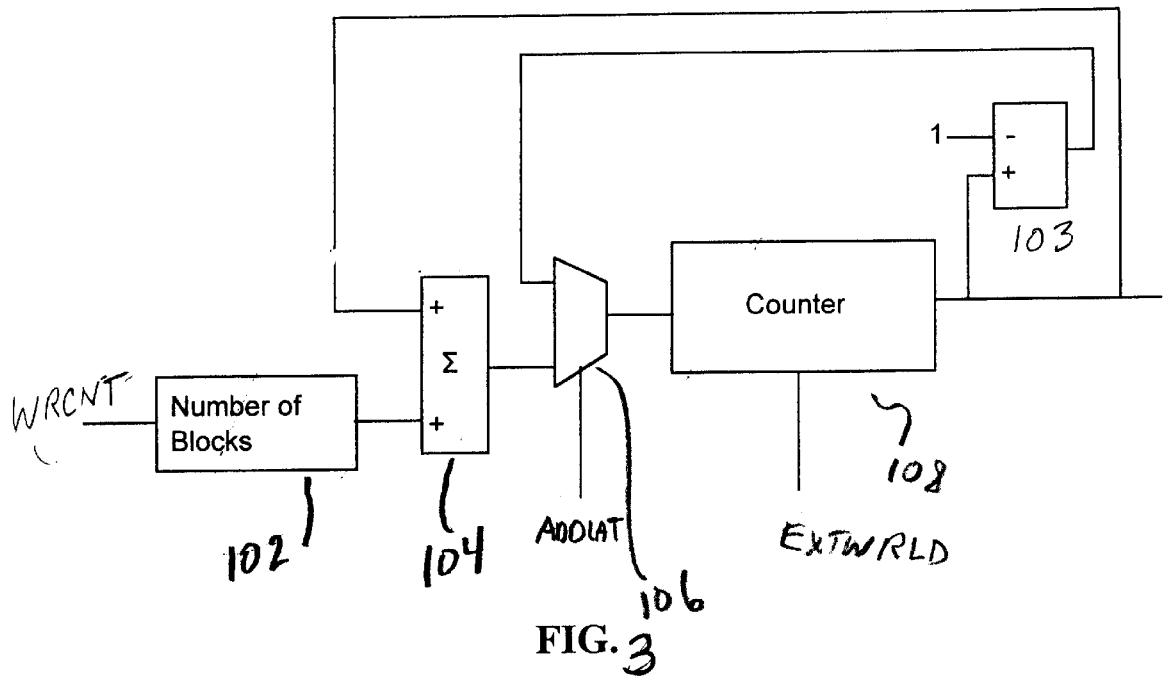
FIG. 3 illustrates a generalized architecture of the circuitry that allows a user to modify the amount of data transferred during a data transfer operation for use in the disc controller of FIG. 2 in accordance with an embodiment of the present invention.

The system of the present invention is capable of adding data to a write operation while the write operation is in progress. The device governing this aspect of the invention is illustrated generally in FIG. 3. Normally, in a disc data transfer operation, a counter is set to a value equal to the number of blocks to be transferred. After each block is transferred, the counter is decremented. Once the counter reaches zero, the controller signals that the transfer operation is complete. The present invention permits the intermediate count value held by the counter to be added to during the transfer operation when a request is made for additional blocks of data to be transferred while the operation is in progress. For example, if a request is received from firmware for additional blocks to be written to disc while a write operation is in progress, the number of additional blocks to be added to the write operation is specified in WRCNT register 102 of disc controller 30 and the increment operation is carried out by an augmenter, which includes, for example adder 104 and selection circuit 106. The number of additional blocks to be added to the write operation is provided to one input of adder 104. The intermediate count value, i.e., the number of blocks currently remaining to be written, is provided to the other input of adder 104. from counter 108. The output of adder 104 represents the sum of the additional blocks plus the intermediate block count. This sum represents an updated block count. The updated block count is provided to one input of selection circuit 106. The other input of selection circuit 106 receives the intermediate block count. Selection circuit 106 normally outputs the intermediate block count when it is not enabled. When enabled, however, selection circuit 106 outputs the sum of the old and new counts from adder 104, i.e., the updated block count. The ADDLAT signal is generated by finite state machine 201.

Figure 4:
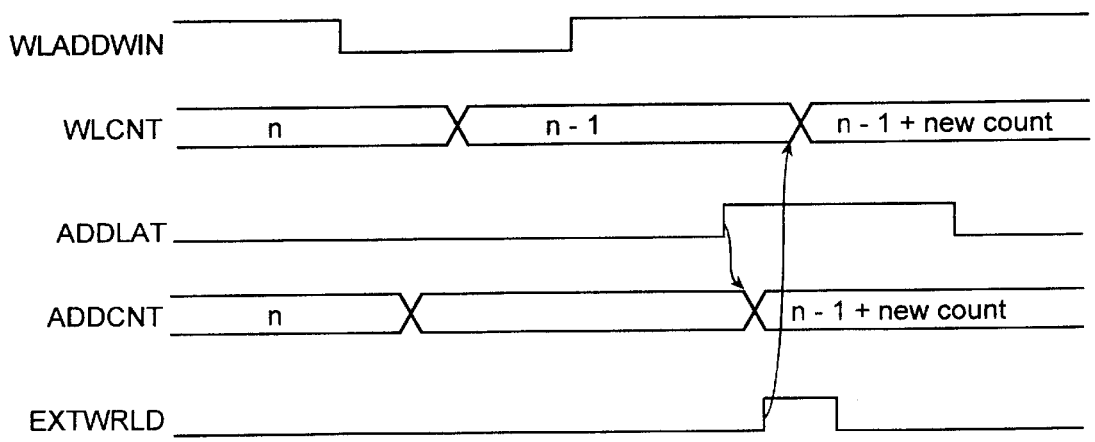
FIG. 4 illustrates a generalized timing diagram of the operation of the circuitry of FIG. 3.
Figure 5:
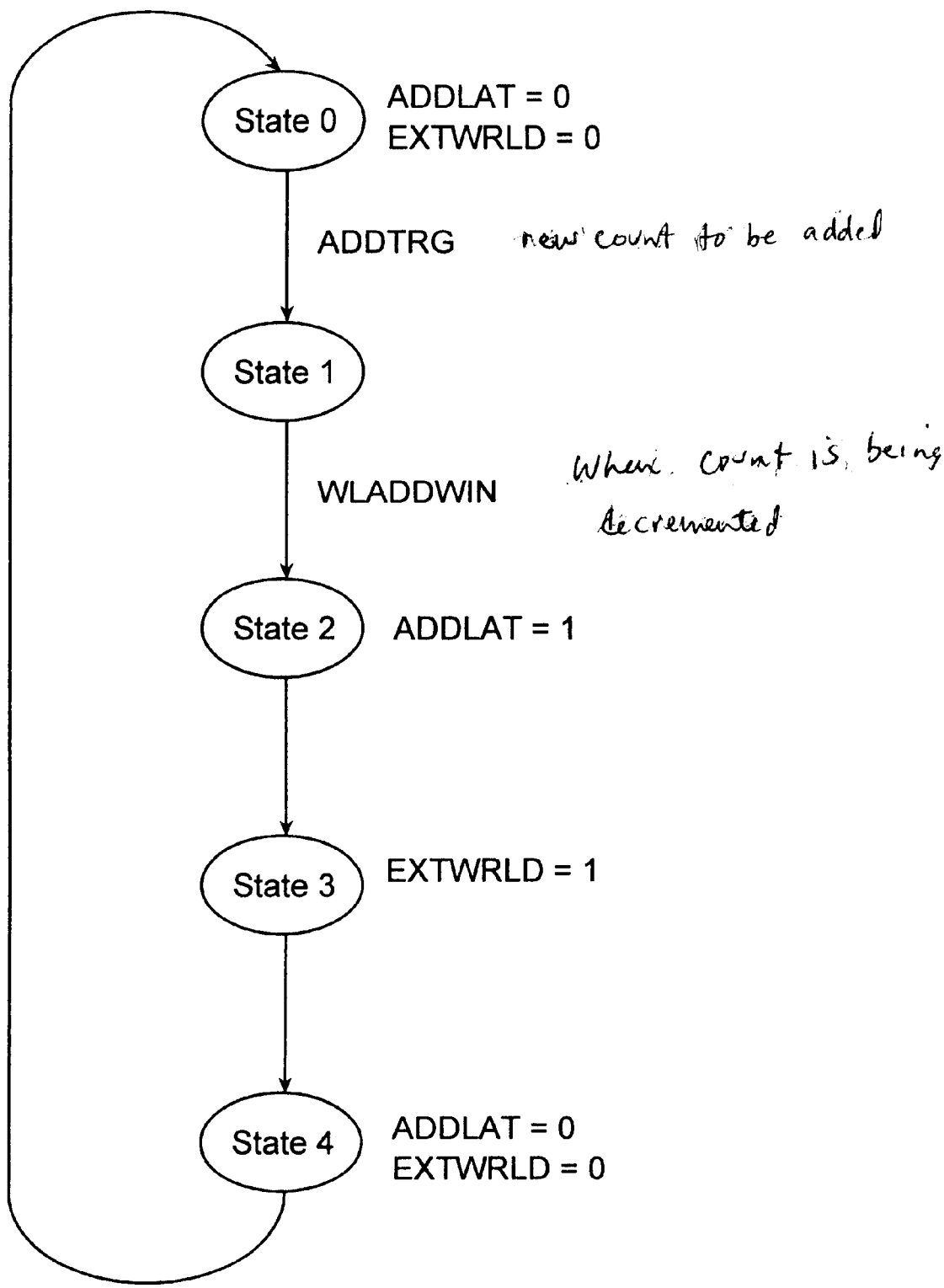
FIG. 5 illustrates a state diagram in connection with operation of the circuitry of FIG. 3.
Figure 6:
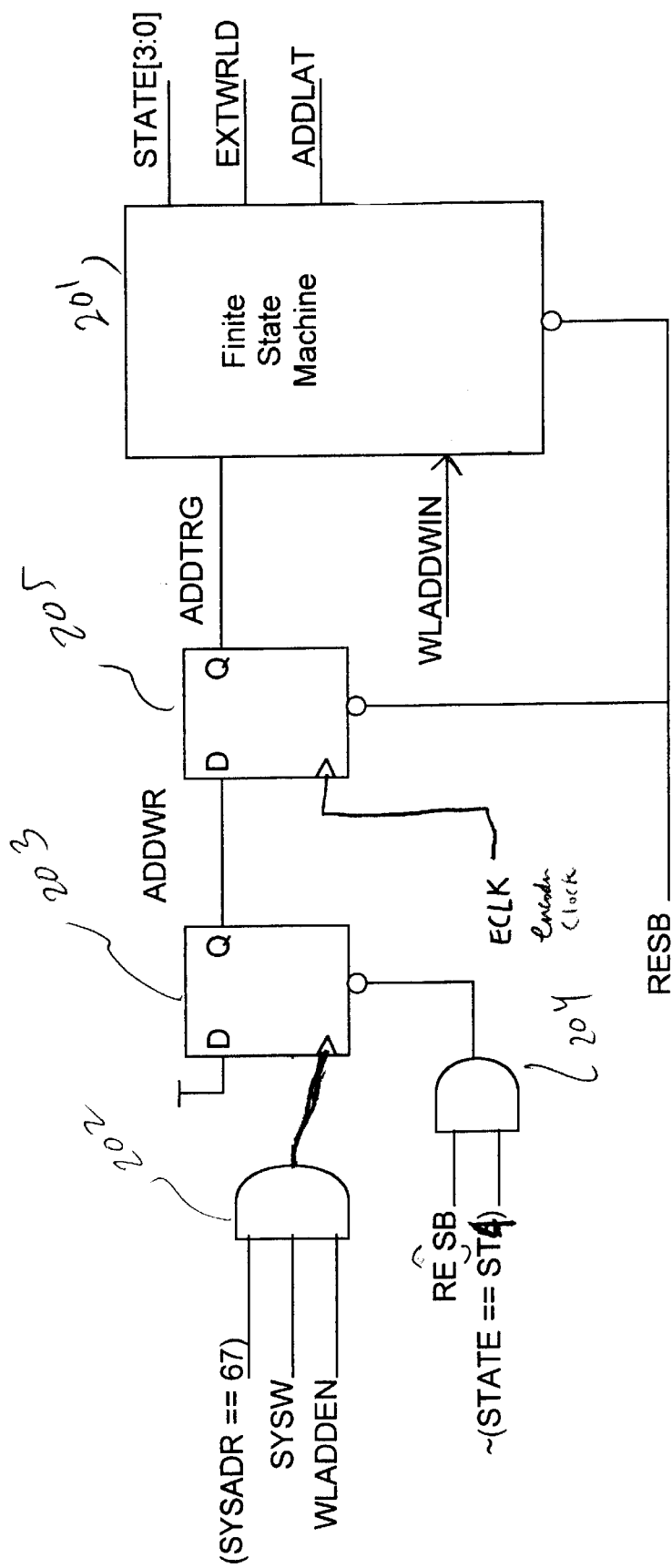
FIGS. 6, 7 and 8 are more detailed circuit diagrams of an embodiment of the invention of FIG. 3.
Figure 7:
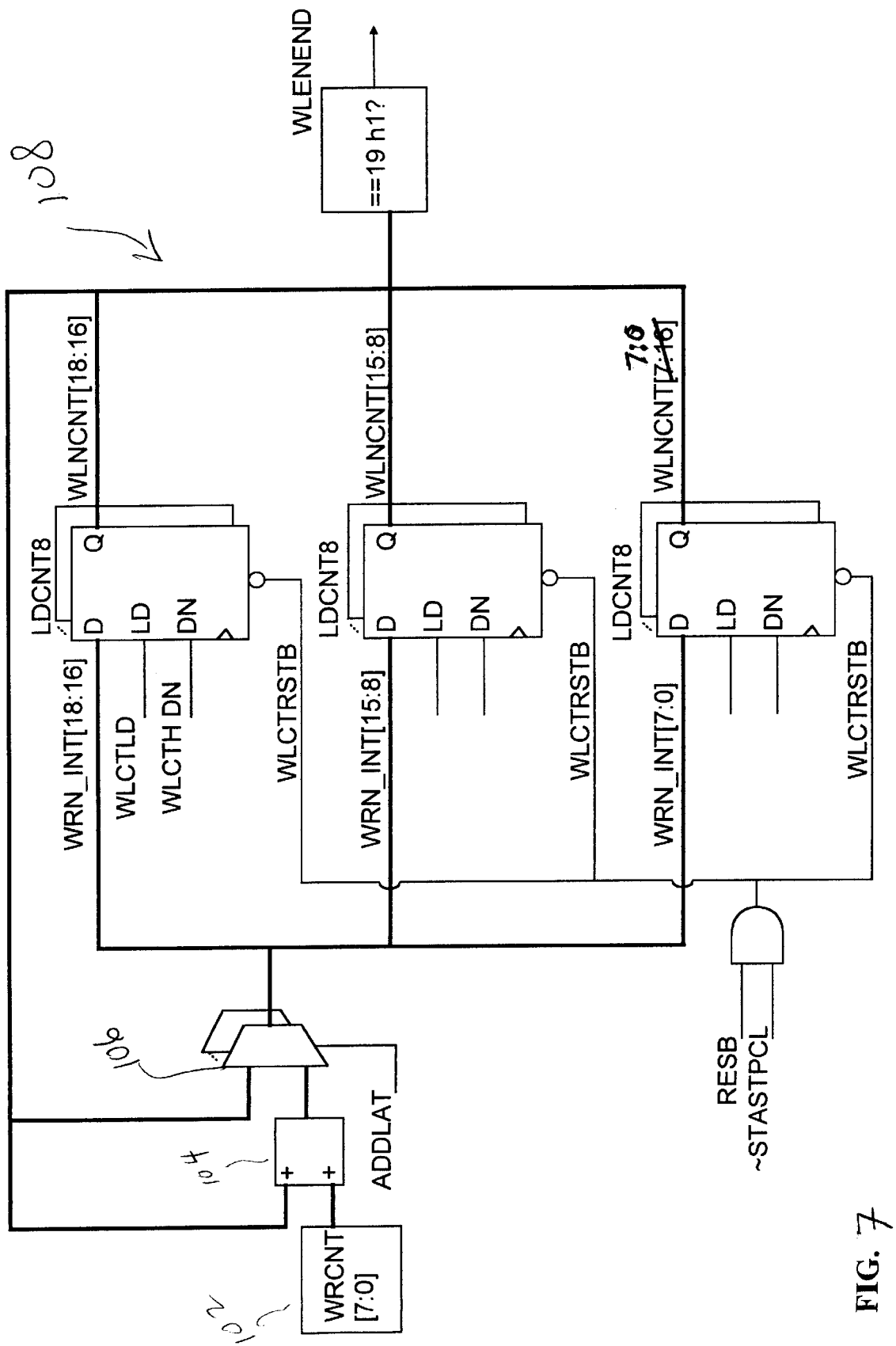
Figure 8:
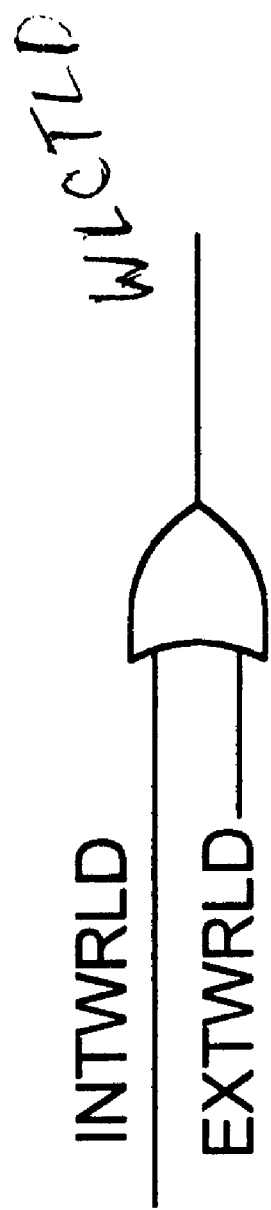

The state diagram of FIG. 5 and the timing diagrams of FIG. 4 show the sequence and timing of the operations for adding to the count of a write operation in progress. With reference to FIGS. 4 and 5, the operation of finite state machine 201 and surrounding circuitry of FIG. 6 will now be described.

Finite state machine 201 controls add-to-count operations and cycles through 5 states labeled states 0 through 4 on FIG. 5. Initially, finite state machine 201 is in the rest state, state 0. When the count is to be incremented, an ADDTRG signal causes finite state machine 201 to move to state 1. State 2 is triggered by WLADDWIN, register bits from encoder 76 which are high during the allowable window for the add operation to proceed safely During state 2, an add-to-count state, the intermediate count is updated by the ADDLAT signal generated by finite state machine 201. State 3 occurs when WLADDWIN is low and no further changes to the count are allowed. Finally state 4 occurs when the write operation is complete.

ADDTRG, the signal that triggers state 1, is generated as follows. Logical AND gate 202 combines three signals: SYSADR ==67 an address register in encoder 76 written to by system controller 70, SYSW, the write strobe from system controller 70 and WLADDN, a control register of encoder 76. When these values are high, flip flop 203 is clocked and ADDWR is generated. The output of flip flop 203 is provided to the input of flip flop 205 which is clocked by ECLK, the encoder clock. The output of flip-flop 205, which is synchronous with the encoder clock, is ADDTRG. To move to state 2 and update the count, one other signal is needed by finite state machine 201, WLADDWIN. As shown in FIG. 4, WLADDWIN is high except when the count held by counter 108 is transitioning. Thus, finite state machine 201 will transition from state 1 to state 2 unless WLADDWIN is low, indicating the count in counter 108 is changing. In state 2, finite state machine 201 generates the ADDLAT signal (an update count signal) which is supplied to selection circuit 106 to provide the updated count value to counter 108. In state 3 the updated count held by selection circuit 106 is latched into counter 108. EXTWRLD also is used in the add-to-counter state to signal to firmware that it is permissible once again to assert WRCNT and increment the count. Finally, AND gate 204 combines RESB and STATE ==ST4 and clears flip flops 203 and 204 and finite state machine 201 when the write operation is completed. It is important to note that the counter can be updated only after it has been updated to reflect the current intermediate number of blocks written to the disc.

Figure 9:
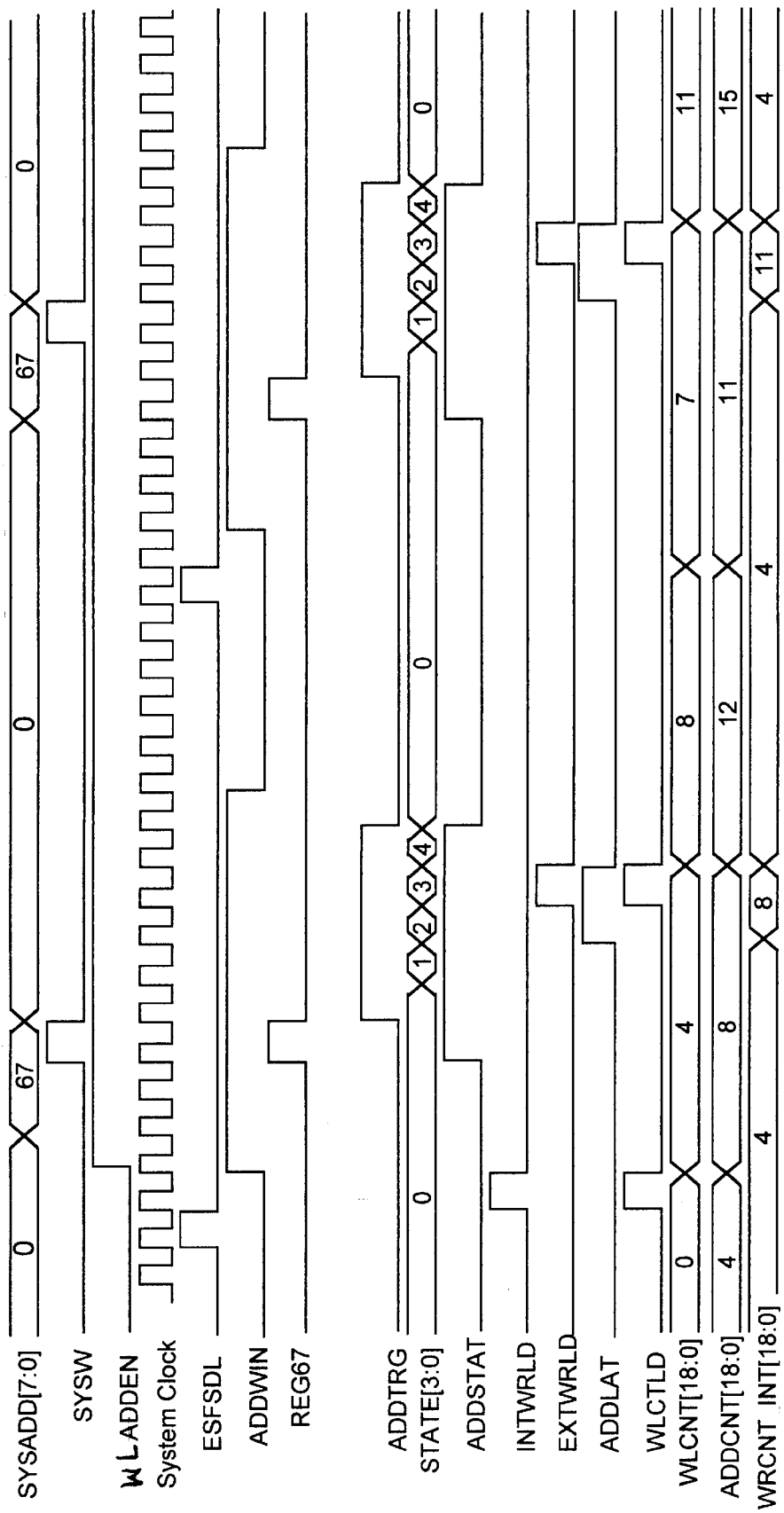
FIG. 9 is a timing diagram of the circuit of FIGS. 6, 7 and 8.

FIG. 9 shows additional details concerning the timing of the operations of the present invention. With reference to FIG. 9, WRCNT[18:0] is the number of additional blocks to be added to the write operation; SYSADD[7:0] is the address bus of controller 70; SYSW is the controller 70 write strobe; ADDEN is a register bit of encoder 76 that indicates that adding to the count is enabled; System clock is the main clock signal; ESFSDL is a signal that indicates that a block of data has been transferred and hence the block counter is decremented pursuant to a decrement intermediate count signal; ADDWIN is the allowable window for the adding operation to process safely; REG67 is a control signal that indicates that adding to the count is requested and is generated from SYSADD[7:0](==67), SYSW and ADDEN; ADDTRG triggers finite state machine 201 to start; STATE [3:0] shows the state of the finite state machine that controls the adding counter feature; ADDSTAT indicates that adding to the count is in progress and not to send another request to add to the count until this signal is "0"; INTWRLD is the signal that latches the initial count upon the start of the write operation; EXTWRLD is the signal latches the additional count during the write operation; ADDLAT is an update count signal that indicates that the new count is added to the existing count and then latched into counter 108; WLCTLD is the combined signal of INTWRLD and EXTWRLD;

WLCNT[18:0] is the counter that keeps track of the number of blocks of data to be written to the CD; ADDCNT[18:0] is a register where the existing count and the new additional count are added and stored first before being transferred to WLCNT[18:0].

Although the present invention has been described in terms of an optical disc, as would be apparent to one of ordinary skill in the art, the invention can be applied generally to any readable and writable medium where data is transferred pursuant to a counter, regardless of the format or media. In particular, the present invention may also be used to write data to discs such as DVD-RAM or DVD-RW while rotating the disc at a constant angular velocity.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A device for transferring data comprising:
    a data counter to generate an intermediate count value in accordance with a first amount of data to be transferred to a storage media; and
    an augmenter to augment the intermediate count value by a specified count value in accordance with data to be transferred in addition to the first amount of data to arrive at an updated count value, wherein the updated count value is loaded into the data counter such that the intermediate count value becomes equal to the updated count value during a data transfer operation.

2. The device of claim 1 wherein the augmenter comprises a selection circuit that selects the updated count value for loading into the data counter at predetermined times.

3. The device of claim 2 wherein the data counter comprises a latch for loading the updated count value from the selection circuit into the data counter at predetermined times.

4. The device of claim 3 wherein the data counter receives a decrement intermediate count signal, and decrements the intermediate count when the decrement intermediate count signal is asserted.

5. The device of claim 1 wherein the updated count value is loaded into the data counter in response to an update count signal.

6. The device of claim 5 further comprising a state machine to generate the update count signal.

7. The device of claim 6 wherein the state machine generates an update count state during which the state machine generates the update count signal, the state machine also generating at least one additional state during which the data counter may decrement the intermediate count value and an update count signal is not generated.

8. The device of claim 7 wherein the state machine generates the update count state after the at least one additional state.

9. The device of claim 1 wherein the data transfer operation is a write operation.

10. The device of claim 1 wherein the storage media comprises an optical disc.

11. The device of claim 1 wherein the data counter is loaded with an initial count value prior to the data transfer operation, the intermediate count value being equal to the initial count value.

12. A disc controller to modify an amount of data transferred during a data transfer operation to a disc drive, comprising:
    a servo system to generate signals to cause an actuator to position a head with respect to a target track of a rotating disc, the servo system also to generate at least one signal to cause a disc motor to rotate the disc;
    a data interface to receive external data from an external datapath to write to the disc, the data interface receiving a first count value from the external datapath, the first count value representing an amount of data to be transferred, the data interface also receiving a second-count value from the external datapath;
    a data counter, initially loaded with the first count value, to generate an intermediate count value initially equal to the first count value;
    an augmenter to augment the intermediate count value by the second count value to generate an updated count value, wherein the data counter is loaded with the updated count value such that the intermediate count value becomes equal to the updated count value during a data transfer operation;
    an encoder to encode the external data to provide encoded data; and
    a write strategy device to supply the encoded data to the head to write on the disc during the write state.

13. The disc controller of claim 12 wherein the augmenter includes an adder that adds the second count value to the intermediate count value.

14. The disc controller of claim 12 further comprising a register to store the intermediate count value.

15. The disc controller of claim 12 wherein the data counter receives a decrement count signal, and decrements the intermediate count when the decrement count signal is asserted.

16. The disc controller of claim 12 wherein the updated count value is loaded into the data counter in response to an update count signal.

17. The disc controller of claim 16 further comprising a state machine to generate the update count signal.

18. The disc controller of claim 17 wherein the state machine generates at least one state during which the data counter decrements the intermediate count value, the state machine also generating an add-to-count state, the state machine generating the update count signal during the add-to-count state.

19. A method of modifying an amount of data transferred during a data transfer operation to a disc drive, comprising:
    initiating a data transfer operation to transfer an initial amount of data wherein an intermediate count value is initially equal to the initial amount; and
    during the data transfer operation:
        decrementing the intermediate count value as data is transferred;

receiving a specified count value representing an amount of data to be transferred in addition to the initial-amount;

augmenting the intermediate count value by the specified count value to arrive at an update count value such that the intermediate count value becomes equal to the updated count value during the data transfer operation; and transferring data in accordance with the updated count value.

20. The method of claim 19 wherein the intermediate count value may be augmented more than once during a data transfer operation .

21. The method of claim 19 further comprising:
receiving the update-count value from datapath connections external to a disc controller of which a data counter is a part.

22. The method of claim 19 wherein the data transfer operation transfers data in blocks, and the step of decrementing decrements the intermediate count value after a block is transferred.

23. The method of claim 19 wherein the step of augmenting occurs within a window when decrementing is not performed.

24. The method of claim 19 wherein the augmenting includes adding the intermediate count value and the update count value to provide a revised intermediate count value.

* * * * *

UNITED STATES PATENT AND TRADEMARK OFFICE
CERTIFICATE OF CORRECTION

PATENT NO.   : 6,470,063 B2
DATED        : October 22, 2002
INVENTOR(S)  : Bee-Bee Liew It is certified that error appears in the above-identified patent and that said Letters Patent is hereby corrected as shown below:

<u>Column 6,</u>
Line 29, change "count value by" to -- Count by --.
Line 34, change "a data transfer" to -- data transfer --.

<u>Column 8,</u>
Line 3, change "of which a data" to -- of which data --.

Signed and Sealed this

Eighteenth Day of March, 2003

JAMES E. ROGAN
*Director of the United States Patent and Trademark Office*